United States Patent
Loisel et al.

(10) Patent No.: US 9,832,027 B2
(45) Date of Patent: Nov. 28, 2017

(54) TAMPER DETECTION SYSTEMS AND METHODS FOR INDUSTRIAL AND METERING DEVICES NOT REQUIRING A BATTERY

(71) Applicant: Maxim Integrated Products, Inc., San Jose, CA (US)

(72) Inventors: Yann Yves Rene Loisel, La Ciotat (FR); Frank Lhermet, Roquevaire (FR); Alain-Christophe Rollet, La Ciotat (FR)

(73) Assignee: Maxim Integrated Products, Inc., San Jose, CA (US)

(*) Notice: Subject to any disclaimer, the term of this patent is extended or adjusted under 35 U.S.C. 154(b) by 117 days.

(21) Appl. No.: 14/849,310

(22) Filed: Sep. 9, 2015

(65) Prior Publication Data
US 2016/0098918 A1 Apr. 7, 2016

Related U.S. Application Data

(60) Provisional application No. 62/058,556, filed on Oct. 1, 2014.

(51) Int. Cl.
| G06F 12/00 | (2006.01) |
| H04L 9/32 | (2006.01) |
| G06K 19/073 | (2006.01) |
| G06F 21/34 | (2013.01) |
| G06F 21/60 | (2013.01) |
| G06F 21/71 | (2013.01) |
| G06F 21/86 | (2013.01) |

(52) U.S. Cl.
CPC ............ *H04L 9/3271* (2013.01); *G06F 21/34* (2013.01); *G06F 21/60* (2013.01); *G06F 21/71* (2013.01); *G06F 21/86* (2013.01); *G06K 19/07336* (2013.01); *H04L 9/3234* (2013.01)

(58) Field of Classification Search
CPC ......... H04L 9/3271; G06F 21/34; G06F 21/60
USPC ....................................................... 726/20
See application file for complete search history.

(56) References Cited

U.S. PATENT DOCUMENTS

| 2005/0195975 A1* | 9/2005 | Kawakita | ............... | H04L 9/0822 380/30 |
| 2011/0145586 A1* | 6/2011 | Meyn | ....................... | G06F 21/72 713/176 |

\* cited by examiner

*Primary Examiner* — Anthony Brown
(74) *Attorney, Agent, or Firm* — North Weber & Baugh LLP

(57) ABSTRACT

Embodiments of the invention prevent unauthorized access to electronic systems by providing an enclosure with improved intrusion detection around sensitive areas of a secured electronic system. Certain embodiments eliminate the need for constant battery power and yet provide uninterrupted high-security supervision at the device perimeter such that even following a power down event it is possible to determine whether a device has been tampered with, so that appropriate action can be taken. This is especially useful in applications in which batteries are not acceptable.

20 Claims, 4 Drawing Sheets

TAMPER DETECTION SYSTEMS AND METHODS FOR INDUSTRIAL AND METERING DEVICES NOT REQUIRING A BATTERY

CROSS REFERENCE TO RELATED PATENT APPLICATIONS

This application is related to and claims the benefit of U.S. Provisional Application No. 62/058556, titled "Tamper Detection Systems and Methods for Industrial & Metering Devices not Requiring a Battery," filed Oct. 1, 2014, listing inventors Yann Yves Rene Loisel, Frank Lhermet, and Alain-Christophe Rollet, which application is hereby incorporated herein by reference in its entirety.

BACKGROUND

A. Technical Field

The present invention generally relates to secure systems, and more particularly, to systems, devices, and methods of detecting tampering in electronic systems to prevent unauthorized access to sensitive data.

B. Background of the Invention

Secured electronic systems such as banking terminals protect valuable assets and encrypted sensitive data within a trusted environment to prevent unwanted access or inspection by potential attackers. Typical countermeasures against intruders who tamper with physical devices to gain access to secured sensitive data involve the implementation of a security perimeter around sensitive areas of the device. High-security physical protection includes the application of electric meshes and switches that aid in the detection of tampering attempts and raise a flag to signal the likelihood of an intrusion. Once an intrusion is detected, the secured system may, for example, erase its decryption keys and other sensitive information stored in usually stored in memory devices within a computer system to prevent capture of secret information by adversaries.

Efficient security measures against physical tampering require 24/7 protection that constantly monitors the physical device that contains the sensitive information, i.e., the device must always remain in a power-on condition to prevent the possibility of unauthorized access during times when power is cut off. Alternatively, non-critical parts of the device may be turned off, while an energy source (e.g., a battery) provides sufficient energy to the device to maintain the security monitoring system in operating condition to continue to protect the most critical components and alert external devices, for example by sending an alarm, in order to ensure a desired level of protection. Thus, even if the secure device itself is completely powered down, the monitoring system remains permanently active and in control of the physical integrity of the device.

Security monitoring systems containing protective electric meshes and other active parts are electrically operated and designed to detect any interruptions or modifications in the characteristic of a reference signal, such as a voltage or resistance value, as an indicator of a potential act of physical tampering. Battery power is generally sufficient to additionally monitor environmental conditions, such as temperature and vibrations resulting from shock events, to further increase system security. Especially, hardware security modules (HSMs) that require very high security for key storage and data rely on battery power to perform 24/7 monitoring, such that even in a power outage situation a battery-backed security monitoring system is in place that controls the security of the physical perimeter of the device and ensures that sensitive data is not accessed without authorization, recorded, or otherwise tampered with. Payment terminals and other devices containing secure microcontrollers use battery-backed security monitoring systems that have an average battery lifetime of about 7 years. This is appropriate in most instances as HSMs are generally obsolete and replaced within that time period, such that the battery lifetime exceeds the actual operating time of the device in the field.

However, devices with rather long lifetimes, such as smart meters are expected to operate in the field for 30 years or more and practically without requiring any maintenance or, at least, with as little maintenance as possible. Given that even the most advanced batteries have a less than 10-year lifetime, this shortcoming renders protection of these devices ineffective once their batteries require replacement and power must be interrupted for a certain period of time to perform maintenance work. Similarly, for industrial devices that are located in remote places, such as oil or gas pipelines that are designed to operate as no-maintenance devices, replacing batteries in the field is not a viable solution due to the extremely high maintenance and support cost and, more importantly, security issues associated with powering down and opening a secure device that is intended to remain unopened.

Currently, no practical solutions exist to ensure around-the-clock protection for high-security and long-life devices. Once the device is shut down, it is exposed and there is no security at all. Attackers may access the device, perform circuit modifications without being detected, and after the device is powered back up there is no information to indicate that the device has been invaded and manipulated in the meantime. The most sophisticated attackers may not even attempt to retrieve secrets during the power off stage, but instead, take the opportunity to install some electronic malicious code (e.g., a Trojan Horse) into the device, such that when the power is turned back on, the modifications that the attacker has performed can be used to intercept data and expose valuable assets (e.g., record and extract passwords) without leaving a trace that can be easily detected from a remote location.

Therefore, what is needed are tools that provide uninterrupted high-security supervision at the device perimeter, such that even following a power down event, it is possible to determine whether the device has been tampered with, so that appropriate action can be taken.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that this is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

In this document the terms "mesh, mesh envelope, and mesh circuit" are used interchangeably as are the terms "key, secret key, and secret," and "secure chip and smart card." The term "secure device" includes secure microcontrollers, secure storage devices, and other secure elements recognized by one of skilled in the art.

Figure 1:
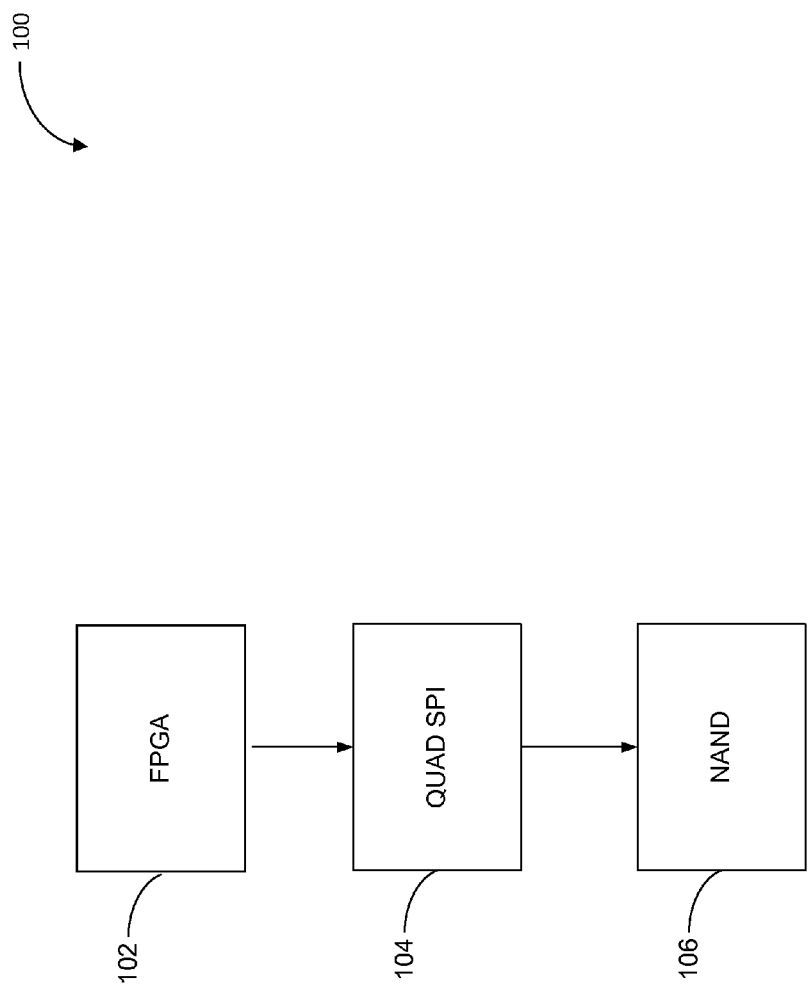
FIG. 1 shows a prior art tamper detection system for providing device security.

FIG. 1 shows a prior art tamper detection system to provide device security. System 100 is an electronic device designed to hold embedded assets, such as secret keys, e.g., for data encryption or decryption. System 100 comprises FPGA 102 and NAND 106. FPGA 102 is an example of generic microcontroller that is connected to volatile or non-volatile memory NAND 106 via a synchronous serial data link, such as a Serial Peripheral Interface, here, quad SPI 104. FPGA 102 is also connected to an additional communication channel, such as an internet port, USB, serial, 12C, or various peripheral devices.

In operation, FPGA 102 plays a major role in system 100. In addition to handling the embedded assets, FPGA 102 is designed to run applications of various sizes. NAND 106 receives decrypted executable code from FPGA 102 through quad SPI 104 for the purpose of performing computation or executing an application. In order to decrypt the code using a secret key, FPGA 102 uses an internal key from a storage location, for example, by using eFuse or similar technology. However, the safety measures employed by eFuse technology are not considered sufficiently secure to protect the key that remains within the FPGA 102 for the purpose of decrypting data or code received from NAND 106. While FPGA 102 is designed to handle some secret data, in practice, developers usually are limited in their choice of a particular device for a specific technology and purpose. The engineering design selection is primarily based on electrical performance rather than the invariable security features of FPGA 102. Once the eFuse key is known, attackers are able to decrypt everything in system 100. Therefore, absent a secure protection envelope, FPGA 102 cannot be considered a highly secure component of system 100 and should not be used to protect high-value secrets from theft.

In addition, sensitive information is handled in plain text format within device 100 itself. The decryption key is exposed in the path between the storage location of the key and FPGA 102, such there is no active protection that would allow the key to be delivered under trustworthy conditions to ensure that motivated attackers cannot capture it to access the sensitive data.

Assuming, a security mesh were to be used to protect FPGA 102, as is the approach in some existing architectures, the integrity of the electrical mesh would still not be guaranteed, because the mesh that aids in security monitoring will be dependent on battery power to continually protect system 100. In other words, once system 100 is inactive and no longer supplied with battery power, it is exposed to potential attackers who may open the device and, for example, manipulate system 100 to enable eavesdropping once power is restored.

Therefore, to provide adequate protection with a higher level of confidence than at the parts level, it would be desirable to have a system and method to effectively protect against tampering attempts in a power-off stage and ensure secure transfer of sensitive data during regular operation.

Figure 2:
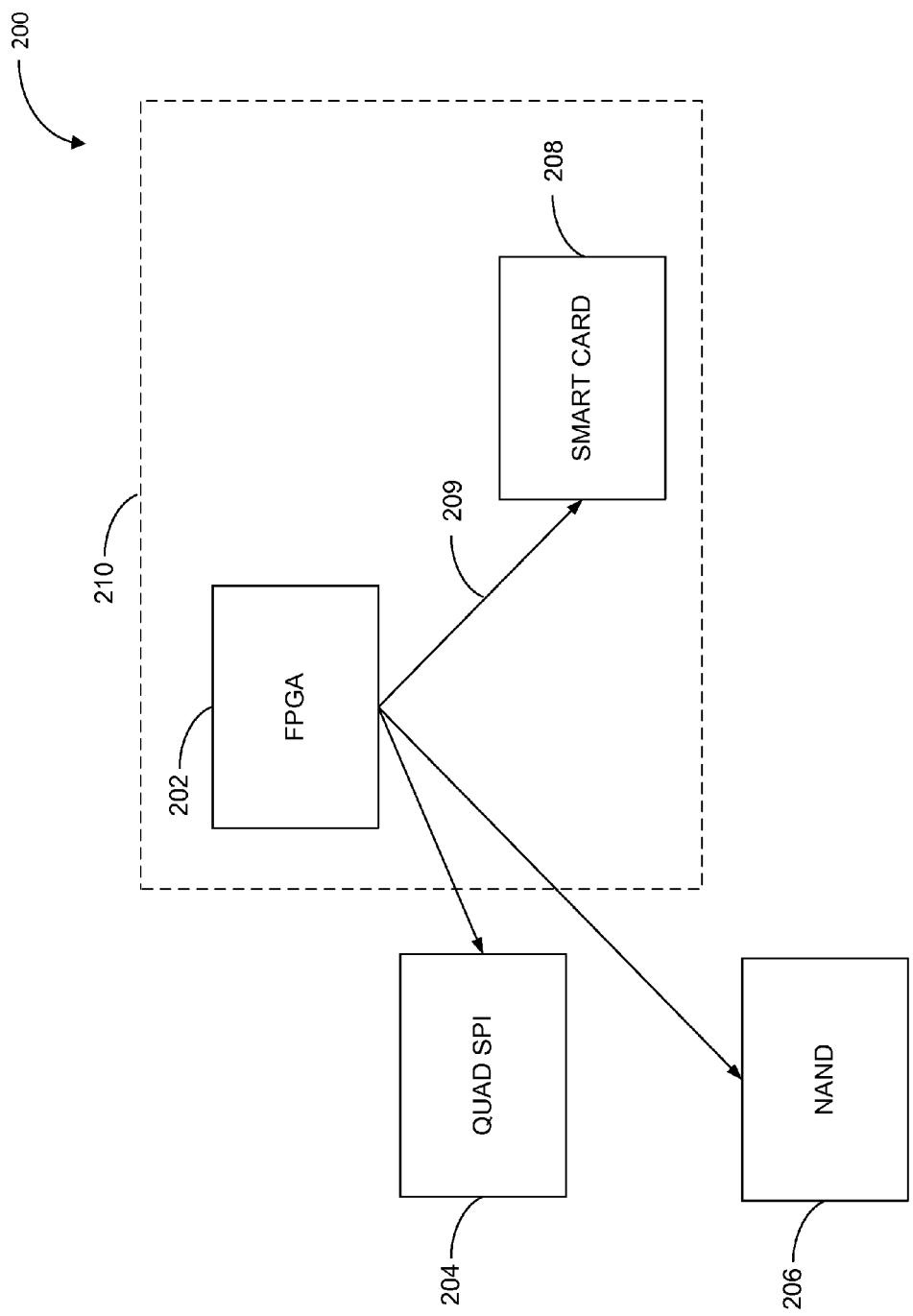
FIG. 2 is an exemplary block diagram of a system to provide tamper detection and prevent unauthorized access to secure electronic systems, according to various embodiments of the invention.

FIG. 2 is an exemplary block diagram of a system to provide tamper detection and prevent unauthorized access to electronic systems, according to various embodiments of the invention. System 200 comprises FPGA 202, NAND 206, smart card 208, and mesh 210. FPGA 202 is representative of any circuit or microcontroller connected, e.g., via quad SPI 204, to volatile and non-volatile memory represented by NAND 206. FPGA 202 may be connected to additional communication channels and devices (not shown). Smart card 208 represents a secure environment that provides relatively higher protection than FPGA 202 eFuse technology. Smart card 208 is considered inaccessible due to the high level of confidence its design provides in terms of security.

In one embodiment, FPGA 202 uses a secret encryption/decryption key that may be stored in memory, for example, internal to smart card 208 to decrypt code located in external memory, e.g., in non-volatile NAND flash 206, which may store code for some larger application, such as an operating system, that previously has been encrypted using the secret key held by smart card 206. In one embodiment, a separate key within FPGA 202 itself may be used to run a relatively smaller non-sensitive code that does not contain any secrets. Smart card 208 is a secure device that typically requires no additional protection from unwanted access to secret data and the decryption key it holds. However, in a power-on condition, since the secret key is transmitted from smart card 208 to FPGA 202 in an unencrypted format, path 209 between smart card 208 and FPGA 202 is vulnerable to attack leaving information about the key exposed in the electrical connection and, thus, path 209 should be protected. As discussed in more detail below, meaningful protection can be accomplished by using an electric mesh 210 that covers both FPGA 202 and smart card 208 to protect transfer path 209, thereby, creating a highly secure area of protected system 200.

Mesh 210 represents an envelope-like environment that is in close proximity to or entirely surrounds FPGA 202, smart card 208, and any other sensitive circuit component. To further increase security, mesh 210 may be implemented in multi-layer configuration. In one embodiment, only portions of system 200 that contain to-be-protected sensitive circuit elements are wrapped by the envelope of mesh 210, which simplifies the design and reduces manufacturing costs. In one embodiment, mesh 210 represents a function that is designed to make it extremely difficult to reverse-engineer its configuration. Mesh 210 may be implemented as an electrical circuit capable of direct or indirect communication with FPGA 210 and smart card 208.

In operation, FPGA 202 is connected to protective mesh 210 and, at a power up condition, provides a value to mesh 210. FPGA 202 or smart card 208 sends a query signal into mesh 210, and depending on the result of the signal, system 200 detects whether mesh 210 has been modified as a result of an attempt to tamper with system 200. The query signal may be a dynamic, random signal that is sent through the wires of mesh 210 to check their validity. If the response received from mesh 210 is valid, system 200 is ready to initiate its routine processes. After FPGA 202 receives from smart card 208 the correct secret key that can decrypt the encrypted code in external non-volatile NAND flash 206, FPGA 202 can proceed with executing decrypted code, etc.

In the event of tampering, however, the circuit characteristics of mesh 210 will be sufficiently different so as to indicate an electrical change when compared to the original, pre-attack condition of mesh 210, which serves as a reference point. By causing a different signal than the expected reference signal, modified mesh 210 allows for the detection of unauthorized access, for example, during a power down event where an attack on system 200 is most likely to occur. Additional protection is provided by alerting system 200 of any tampering event on mesh 210, thereby, significantly increasing the security of system 200.

In one embodiment, different or random patterns are employed for mesh 210 for each system 200 by taking advantage of, or even reinforce, intrinsic variations in the manufacturing process of mesh 210 based on printed electronics in order to obtain individualized mesh circuits with unique electrical characteristics. As a result, even if one device is stolen for the purpose of studying and reengineering its design, attackers' efforts will be rendered useless by the uniqueness of each mesh circuit 210, further increasing system security.

In one embodiment, in a power-off condition, only smart card 208, i.e., a highly secure environment that is considered impenetrable is used to store and sufficiently protect the smart card decryption key making the key inaccessible to potential intruders. The key and sensitive data are not exposed at all. In addition, any tampering with protective mesh 210 can be detected when power is turned back on, such that smart card 208 releases secrets only after verification that path 209 is secure, i.e., after verifying that mesh 210 has not been modified or tampered with during the power off session.

Smart card 208 may be directly connected to mesh 210 so that it can directly verify the integrity of mesh 210 and, in effect, act as a boot controller for FPGA 202. In this embodiment, verification by smart card 208 is a prerequisite to starting up FPGA 202 and smart card 208 releasing decryption key to FPGA 202. In one embodiment, smart card 208 is connected to mesh 210 via FPGA 202 and releases secrets after a request by FPGA 202 accompanied by a verification of the integrity of mesh 210. One skilled in the art, will appreciate that other, more complex topologies of connecting mesh 210 and smart card 208 may be employed without deviating from the scope of the invention. In either case, since smart card 208 transmits the secret key to FPGA 202 only under secure conditions, embodiments of system 200 ensure that no secret is accessible to attackers at any moment in time and that the security of system 200 has not been compromised.

Figure 3:
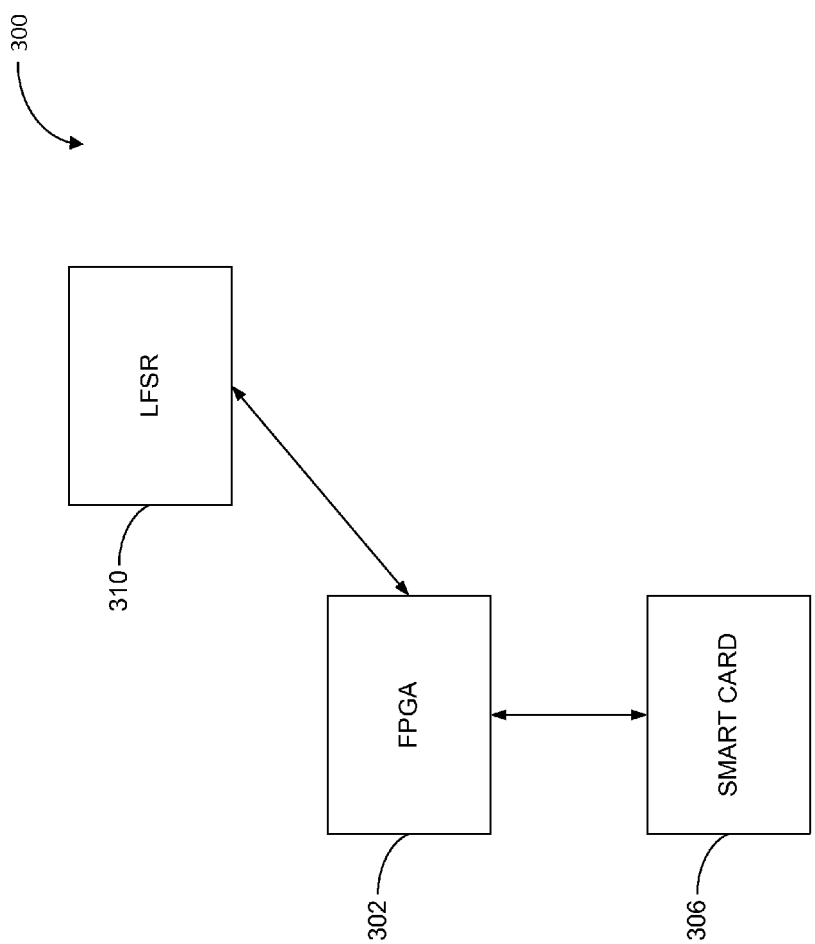
FIG. 3 is an exemplary block diagram of an apparatus to provide tamper detection and prevent unauthorized access to secure electronic systems, according to various embodiments of the invention.

FIG. 3 is an exemplary block diagram of an apparatus to provide tamper detection and prevent unauthorized access to electronic systems, according to various embodiments of the invention. For clarity, components similar to those shown in FIG. 2 are labeled in a similar manner. As shown in FIG. 3, apparatus 300 comprises FPGA 302, smart card 308, and Linear Feedback Shift Register (LFSR) 310. In one embodiment, FPGA 302 acts as a conduit between smart card 208 and mesh 210 to facilitate a simpler connection between smart card 208 and mesh 210 than a direct connection. Smart card 306 is any highly secure device that comprises a secure element capable of storing a secret key and may be implemented as a chip that contains secrets and sensitive data used during regular operation when apparatus 300 is powered on. Smart card 306 typically has very limited computational power and is not used for extensive computations or the to execute larger applications. Instead, smart card 306 is mainly used to handle and store the secret data. LFSR 310 is an electrical circuit that physically surrounds, at least partially, FPGA 302 and smart card 308. In one embodiment, LFSR 310 comprises printed transistors having logical functions such that LFSR 310 can be viewed as an electronic network whose electrical characteristic, in particular its transfer function, depends on its physical structure and method of fabrication. Once the input to LFSR 310 is known, its output will be a specific value that depends on both LFSR 310 itself and the input value.

LFSR 310 may be constructed, for example, from conductive silver-carbon ink that is printed on a support surface made from PET, polyamid, or any other suitable electric insulator material or dielectric. The conductive but relatively fragile ink wire frame will be partially destroyed and cease to properly operate once it is physically tampered with. At the least, the electrical characteristics of LFSR 310 will be modified to such as degree that its circuit response will change sufficiently to be detected. In one embodiment, LFSR 310 is intentionally designed to exploit existing manufacturing variations in the generation of a random values during a validation process by making it impossible to compute or guess the electrical characteristic and network response of LFSR 310. Constructing LFSR 310 different from one device to another frustrates re-engineering efforts of LFSR 310 and attempts by high-level attackers to use the knowledge gained from one device on a second device, in effect, creating a secret design.

In operation, prior to using the decryption key stored in smart card 308, FPGA 302 may initially use its own eFuse key stored internal to FPGA 302, for example, in order to execute a small code during its booting process in power-on condition. The code causes FPGA 302 to send to smart card 306 a request for the decryption key. However, to increase the confidence level prior to validating the request, in one embodiment, smart card 306 does not rely on this request alone. Rather, smart card 306 initiates a validation process of the request by responding with its own request for an input challenge value from FPGA 302, which may be an internally generated random value that cannot be easily guessed. In one embodiment, LFSR 310 is designed to receive the input challenge value from FPGA 302, perform a mathematical operation or a computation based on the challenge, and return an appropriate result. In this regard, LFSR 310 can be viewed as a secret function. Since potential attackers cannot anticipate the exact challenge that smart card 306 will send to LFSR 310, it will be virtually impossible to ascertain or re-compute the expected result.

Even in the unlikely event that LFSR 310 itself is successfully reverse engineered at the physical level (i.e., the transistor level) by analyzing the structure without unfolding or physically flattening LFSR 310, which would likely destroy its configuration, the uniqueness of the random sequences generated as a challenge by smart card 306 at each start-up make the combination of the input challenge and its response non-discoverable.

Once FPGA 302 retrieves the result, for example in form of a circuit response to the input challenge, and forwards the result to smart card 306, smart card 306 can then re-compute the result using a relatively simple function in order to verify that the result matches the challenge that smart card 306 previously generated. In one embodiment, smart card 306 compares its internally generated value to the value provided by LFSR 310 via FPGA 302, and if smart card 306 successfully verifies the expected result, it concludes that LFSR 310 has not been modified, replaced, or otherwise tampered with, providing high confidence that apparatus 300 operates in a power-on and safe condition. Finally, smart card 306 may send the key to FPGA 302 for decryption of data stored on some internal or external memory and for FPGA 302 to proceed to operate as intended by loading and executing various applications.

In the event that the function returned by LFSR 310 does not provide the correct result and the value that LFSR 302 computes is unacceptable to smart card 306, smart card 306 will interpret this as an indication of a physical penetration of LFSR 302 or a tampering attack on apparatus 300 that likely occurred during the previous power off event. Smart card 306 may then take appropriate action, which may include the refusal to transmit the key in plain text to FPGA 302 in order to prevent a boot process or similar action. Additional or alternative countermeasures in the event of a lack in confidence that apparatus 300 has not been compromised may include sending an alarm to the firmware in order to identify the intrusion, permanently erasing secret keys, and performing a different routine in order to protect the overall system.

Figure 4:
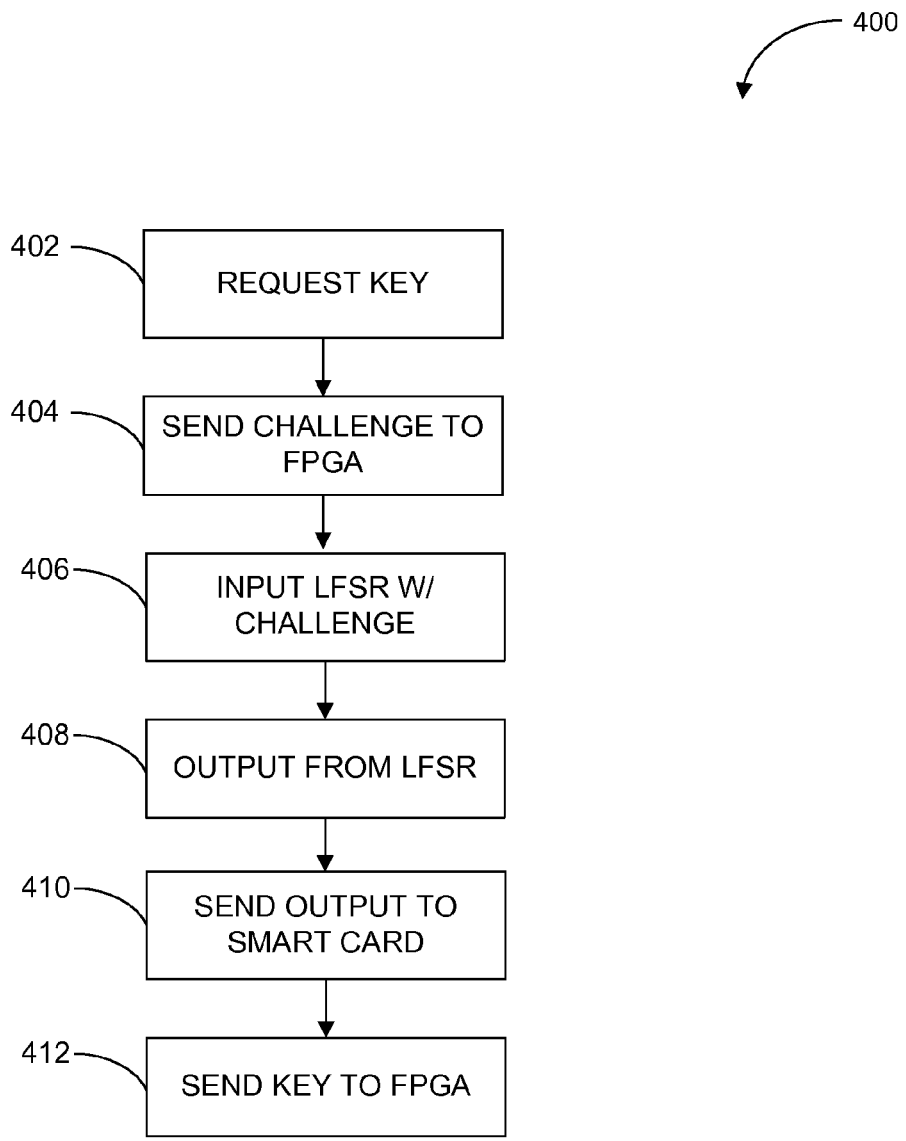
FIG. 4 is a flowchart of an illustrative process process to provide tamper detection and prevent unauthorized access to secure electronic systems, in accordance with various embodiments of the invention.

FIG. 4 is a flowchart of an exemplary process to provide tamper detection and prevent unauthorized access to electronic systems, according to various embodiments of the invention. The process to provide tamper detection begins at step 402 when a microcontroller, such as an FPGA, sends to a smart card a request for a decryption key for code that is stored in some internal or external memory. At step 404, the smart card receives the request and initiates validation of the request by responding with its own request for a challenge value. At step 406, the FPGA sends the challenge to an envelope circuit, e.g., an LFSR. At step 408, the LFSR answers by outputting a circuit response. At step 410, the FPGA forwards the result to the smart card. Finally, at step 412, once the smart card verifies the result, i.e., that it is the expected result matching the challenge, indicating that that circuit has not been modified or replaced, the smart card sends the key to the FPGA, so that the FPGA can decrypt the code and run the application.

In one embodiment, the smart card is used as a boot controller to power up the FPGA. The smart card itself performs a validation of the challenge value sent to the envelope circuit and releases the decryption key to the FPGA only after successful validation.

It will be appreciated by those skilled in the art that fewer or additional steps may be incorporated with the steps illustrated herein without departing from the scope of the invention. No particular order is implied by the arrangement of blocks within the flowchart or the description herein.

It will be further appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

We claim:

1. An apparatus to prevent unauthorized access to electronic systems, the apparatus comprising:
    a microcontroller;
    a smart card coupled to the microcontroller, the smart card comprising a first storage element, the smart card is configured to hold a first key, request, from the microcontroller, a validation for a challenge value, and release the first key in response to receiving from the microcontroller a result and verifying the result; and
    an envelope circuit least partially surrounding the smart card and the microcontroller, the envelope circuit creates a secure area of the apparatus and is configured to generate a circuit response upon receiving a challenge from one of the microcontroller and the smart card.

2. The apparatus according to claim 1, wherein the challenge is a unique random sequence that is generated at a start-up condition.

3. The apparatus according to claim 1, wherein the result matching the challenge is a dynamic, random signal that passes through the envelope circuit and is indicative an integrity of the envelope circuit.

4. The apparatus according to claim 1, wherein a transfer function of the envelope circuit is based on at least one of a physical structure and a method of fabrication of the envelope circuit.

5. The apparatus according to claim 4, wherein the transfer function of the envelope circuit is a function of at least one unique intrinsic property of the envelope circuit.

6. The apparatus according to claim 1, wherein the envelope circuit comprises electrical properties that serve as a reference condition.

7. The apparatus according to claim 1, wherein the envelope circuit comprises printed transistor elements having logical functions.

8. The apparatus according to claim 1, wherein the envelope circuit comprises a silver-carbon ink wire frame that is printed on a support surface.

9. The apparatus according to claim 1, wherein the microcontroller is configured to hold a second key that is used for less sensitive data than in the smart card.

10. A system to prevent unauthorized access to electronic systems, the system comprising:
    a microcontroller;
    an external memory coupled to the microcontroller;

a smart card coupled to the microcontroller, the smart card comprising a first storage element, the smart card is configured to hold a first key, request, from the microcontroller, a validation for a challenge value, and release the first key in response to receiving and verifying a result; and an envelope circuit at least partially surrounding the smart card and the microcontroller, the envelope circuit creates a secure area within the system and is configured to generate a circuit response upon receiving a challenge from one of the microcontroller and the smart card the first key being a secret key that can decrypt encrypted code in the external memory.

11. The system according to claim 10, wherein the external memory is coupled to the microcontroller via a synchronous serial data link.

12. The system according to claim 11, wherein the external memory is coupled to receive decrypted executable code from the microcontroller through the synchronous serial data link to perform computation or execute an application.

13. A method to prevent unauthorized access to electronic systems, the method comprising:
requesting from a smart card a first key;
receiving a validation request from the smart card for a challenge value;
sending a challenge to an envelope circuit in response to receiving the validation request;
receiving a circuit response from the envelope circuit;
sending a result to the smart card in response to receiving the circuit response; and
based on a verification of the result by the smart card, receiving the first key from the smart card to decrypt data.

14. The method according to claim 13, wherein the result matching the challenge is indicative of the envelope circuit not having been tampered with.

15. The method according to claim 13, wherein the challenge is an internally generated random value.

16. The method according to claim 15, further comparing the internally generated random value to a value provided by a microcontroller.

17. The method according to claim 13, further comprising generating alert signal in response to detecting a change in electrical properties of the envelope circuit.

18. A method to prevent unauthorized access to electronic systems, the method comprising:
using a smart card as a boot controller to power up a microcontroller, such that verification by the smart card is a prerequisite to starting up the microcontroller;
receiving from the microcontroller a request for a first key;
sending a validation request for a challenge value to the microcontroller;
in response to receiving, from the microcontroller, a result of a challenge, performing a validation of the result of the challenge; and
in response to successful validation releasing the first key to the microcontroller.

19. The method according to claim 18, wherein the result is obtained by performing a mathematical operation on the challenge value.

20. The method according to claim 19, further comprising transmitting the first key in plain text between the microcontroller and the smart card.

* * * * *